United States Patent [19]

Yuasa et al.

[11] 4,309,324
[45] Jan. 5, 1982

[54] SOLIDIFICATION OF LIQUIDS WITH POLYHEXAMETHYLENIMINE

[75] Inventors: Hitoshi Yuasa; Hirosuke Imai, both of Yokohama, Japan

[73] Assignee: Nippon Oil Company, Ltd., Tokyo, Japan

[21] Appl. No.: 127,063

[22] Filed: Mar. 4, 1980

Related U.S. Application Data

[62] Division of Ser. No. 946,528, Sep. 26, 1978, Pat. No. 4,216,307.

[30] Foreign Application Priority Data

| | | |
|---|---|---|
| Sep. 29, 1977 [JP] | Japan | 52-116149 |
| Mar. 16, 1978 [JP] | Japan | 53-29265 |
| Jun. 7, 1978 [JP] | Japan | 53-67617 |
| Jun. 9, 1978 [JP] | Japan | 53-68959 |

[51] Int. Cl.$^3$ .............................................. C08L 79/00
[52] U.S. Cl. .......................... 260/29.2 N; 260/31.2 N;
260/33.6 R; 260/33.8 R; 252/316; 525/417;
525/540; 528/422
[58] Field of Search ............ 260/583 P, 29.2 N, 18 R,
260/33.6 R, 33.8 R, 31.2 N; 528/422; 252/316;
525/417, 540

[56] References Cited

U.S. PATENT DOCUMENTS

| | | | |
|---|---|---|---|
| 3,516,944 | 6/1970 | Litt et al. | 252/316 |
| 4,007,128 | 2/1977 | Poklacki | 252/316 |

FOREIGN PATENT DOCUMENTS

| | | | |
|---|---|---|---|
| 546266 | 2/1974 | Switzerland | 528/423 |

*Primary Examiner*—Wilbert J. Briggs, Sr.
*Attorney, Agent, or Firm*—Wenderoth, Lind & Ponack

[57] ABSTRACT

A process is provided for producing polyhexamethylenimine by condensing hexamethylenediamine at 50° to 300° C. in the presence of a palladium catalyst. The process yields substantially linear, high-molecular-weight polyhexamethylenimines, especially novel polyhexamethylenimines having a molecular weight of at least 1,000. Polyhexamethylenimines having a molecular weight of at least 500 are useful as gelling agents for organic liquids.

6 Claims, 6 Drawing Figures

SOLIDIFICATION OF LIQUIDS WITH POLYHEXAMETHYLENIMINE

This is a division, of application Ser. No. 946,528, filed Sept. 26, 1978, now U.S. Pat. No. 4,216,307.

This invention relates to a process for preparing polyhexamethylenimine. More specifically, it relates to a process for preparing polyhexamethylenimine by condensing hexamethylenediamine in the presence of metallic palladium or a palladium compound.

The invention also relates to a novel use of polyhexamethylene as a gelling agent, and to a novel polyhexamethylenimine compound.

Polycondensation reaction between an alkylenediamine containing 2 to 6 carbon atoms and an alkylene dihalide containing 1 to 4 carbon atoms in the presence of a strong basic compound is known as a process for preparing a polyalkylenepolyamine (J. Polymer Sci. 45, 289, 1960). This method, however, has the defect that because the resulting reaction mixture contains the amine, water, alkaline solution, and salts, it is difficult to separate and recover the desired polyalkylene polyamine, and treatment of by-products such as the alkali metal halide requires huge cost. Furthermore, no report has been made about the synthesis of a polymer of hexamethylenimine by this method.

A method is also known to produce a polyalkylenimine by condensing ethylenediamine or 1,3-propanediamine with the aid of a compound of a transition metal of Group VIII of the periodic table as a catalyst. However, when ethylene diamine or 1,3-propanediamine is condensed, the resulting polyalkylenimine is a di- to tetra-mer of the starting amine, and a polyalkylenimine having a high molecular weight cannot be obtained (Japanese Laid-Open Patent Publications Nos. 41308/76 and 36608/77).

It is also known to produce polyhexamethylenimine by ring-opening polymerization of hexamethylenimine using an acid catalyst (German Patent No. 1037126). This method requires the use of the expensive hexamethylenimine as a raw material, and the reaction must be carried out at a temperature of as high as 200° to 350° C. Furthermore, separation of the polyhexamethylenimine from the catalyst is not always easy. The method also has the defect of not giving polyhexamethylenimine having a high degree of polymerization.

None of these prior art methods have come into commercial acceptance because of the various problems described.

It is an object of this invention therefore to provide a process which can easily afford polyhexamethylenimine of high commercial value in high yields from a cheap starting material without requiring a high reaction temperature.

Another object of the invention is to provide a process for preparing polyhexamethylenimine in which the separation and recovery of the resulting polyhexamethylenimine is very easy.

Still another object of this invention is to provide a process which can optionally afford either polyhexamethylenimines of low degrees of polymerization or those of high degrees of polymerization.

The present inventors made extensive investigations in order to achieve these objects, and found that when hexamethylenediamine is condensed using metallic palladium or a palladium compound at relatively low temperatures, polyhexamethylenimine having the desired degree of polymerization can be obtained in good yields, and the separation of the catalyst is easy.

Specifically, the present invention provides a process for producing polyhexamethylenimine which comprises condensing hexamethylenediamine at a temperature of from 50° to 300° C. in the presence of at least one palladium catalyst selected from the group consisting of metallic palladium and palladium compounds to form polyhexamethylenimine having an average degree of polymerization of at least 3, then separating the catalyst from the reaction mixture, and recovering the polyhexamethylenimine formed.

The catalyst used in this invention is metallic palladium or a palladium compound.

The metallic palladium denotes palladium black, or metallic palladium supported on a carrier. The carrier is, for example, carbon black, magnesium oxide, magnesium chloride, magnesium sulfate, barium sulfate, calcium carbonate, barium carbonate, alumina, silica, silica-alumina, or molecular sieves. Other carriers which do not hamper the reaction can also be used.

The palladium compound, as referred to in this invention, is a palladium complex compound having a valence of 0, 2 or 4. At least one such compound can be used. Specific examples of palladium compounds that can be used in this invention are listed below.

(1) Palladium complex compounds expressed by the general formula $PdL^1L^2L^3$ or $PdL^1L^2L^3L^4$ wherein $L^1$, $L^2$, $L^3$ and $L^4$ each represent a ligand of the formula respectively;

M represents P, As or Sb; $R^1$, $R^2$ and $R^3$ represent a halogen atom, the group $NR_2$ (R being hydrogen or alkyl), a $C_{1-16}$ alkyl, alkenyl, cycloalkyl, cycloalkenyl or aryl group, or derivatives of these; and $R^4$, $R^5$ and $R^6$ represent a hydrogen atom, a $C_{1-16}$ alkyl, alkenyl, cycloalkyl, cycloalkenyl or aryl group, or derivatives of these.

Specific examples of these compounds are as follows:
$Pd[P(C_6H_5)_3]_3$, $Pd(PH_3)_4$, $Pd[P(C_2H_5)_3]_4$,
$Pd[P(n-C_3H_7)_3]_4$, $Pd[P(i-C_3H_7)_3]_4$,
$Pd[P(n-C_4H_9)_3]_4$, $Pd[P(i-C_4H_9)_3]_4$,
$Pd[P(n-C_5H_{11})_3]_4$, $Pd[P(CH=CH_2)_3]_4$,
$Pd[P(C_8H_7)_3]_4$, $Pd[P(C_{10}H_{21})_3]_4$,
$Pd[P(C_{12}H_{25})_3]_4$, $Pd[As(CH_3)_3]_4$,
$Pd[Sb(C_2H_5)_3]_4$, $Pd[As(CH=CH_2)_3]_4$,
$Pd[As(n-C_3H_7)_3]_4$, $Pd(Sb(CH=CH_2)(C_4H_9)_2]_4$,
$Pd[As(C_8H_{17})_3]_4$, $Pd[Sb(cyclo-C_5H_9)_3]_4$,
$Pd[P(cyclo-C_8H_{15})_3]_4$, $Pd[Sb(CH_3)(cyclo-C_6H_{11})_2]_4$,
$Pd[As(cyclo-C_6H_{11})_3]_4$, $Pd[P(C_6H_5)_3]_4$,
$Pd[P(ortho-CH_3-C_6H_4)_3]_4$, $Pd[P(meta-CH_3-C_6H_4)_3]_4$,
$Pd[P(\alpha-C_{10}H_7)_3]_4$, $Pd[P(para-C_6H_5-C_6H_4)_3]_4$,
$Pd[P(para-C_6H_5-C-C_6H_4)_3]_4$, $Pd[As(C_6H_5)_3]_4$,
$Pd[Sb(C_6H_5)_3]_4$, $Pd[Sb(meta-CH_3-C_6H_4)_3]_4$,
$Pd[As(para-CH_3-C_6H_4)_3]_4$, $Pd[P(CH_2-(C_6H_5)(C_3H_7)_2)]_4$,
$Pd[P(C_6H_5)_2(C_6H_{13})]_4$, $Pd[P(C_6H_5)(C_2H_5)_2]_4$,
$Pd[As(C_2H_5)(C_6H_5)_2]_4$,
$Pd[Sb(cyclo-C_6H_{11})_2(OC_6H_{13})]_4$,
$Pd[P(C_{10}H_{21})_2(OC_{10}H_{21})]_4$,
$Pd[P(CH_2-C_6H_5)(OC_3H_{17})_2]_4$,
$Pd[As(C_4H_9)(C_6H_5)(OC_2H_5)_2]_4$,
$Pd[Sb(CH_3)_2(OC_6H_5)]_4$, $Pd[P(OCH_3)_3]_4$,

Pd[P(OC$_2$H$_5$)$_3$]$_4$, Pd[P(OC$_6$H$_5$)$_3$]$_4$,
Pd[P(OC$_6$H$_5$)$_2$(OC$_3$H$_7$)]$_4$,
Pd[P(O-para-NO$_2$-C$_6$H$_4$)$_3$]$_4$,
Pd[P(O-ortho-CH$_3$-C$_6$H$_4$)$_3$]$_4$,
Pd[P(O-meta-CH$_3$-C$_6$H$_4$)$_3$]$_4$,
Pd[P(O-para-CH$_3$-C$_6$H$_4$)$_3$]$_4$,
Pd[P(O-ortho-Cl-C$_6$H$_4$)$_3$]$_4$,
Pd[P(O-para-Cl-C$_6$H$_4$)$_3$]$_4$, Pd[P(OCH$_2$C$_6$H$_5$)$_3$]$_4$,
Pd[As(OCH$_3$)$_3$]$_4$, Pd[Sb(OC$_2$H$_5$)$_3$]$_4$,
Pd[As(OC$_3$H$_7$)$_3$]$_4$, Pd[As(OC$_6$H$_5$)$_3$]$_4$,
Pb[Sb(OC$_6$H$_5$)$_3$]$_4$, Pd[(CH$_3$)$_2$NP(OCH$_3$)$_2$]$_4$,
Pd[(CH$_3$)$_2$NP(OC$_6$H$_{13}$)$_2$]$_4$,
Pd[(CH$_3$)$_2$NP(OC$_6$H$_5$)$_2$]$_4$,
Pd[(C$_2$H$_5$)$_2$NP(C$_2$H$_5$)(OC$_8$H$_{17}$)]$_4$,
Pd[P(N(CH$_3$)$_2$)$_3$]$_4$, Pd[P(N(C$_4$H$_9$)$_2$)$_3$]$_4$,
Pd[P(N(i-C$_3$H$_7$)$_2$)$_3$]$_4$, Pd[P(N(C$_6$H$_5$)$_2$)$_3$]$_4$,
Pd[((CH$_3$)$_2$N)$_2$As(OC$_6$H$_5$)]$_4$,
Pd[As(N(C$_2$H$_5$)$_2$)$_3$]$_4$, Pd[Sb(N(C$_6$H$_{13}$)$_2$)$_3$]$_4$,
Pd(PCl$_3$)$_4$, Pd(AsCl$_3$)$_4$, Pd(SbCl$_3$)$_4$,
Pd[PCl(CH$_3$)]$_4$, Pd[PCl$_2$(C$_6$H$_5$)]$_4$,
Pd[SbCl$_2$(OC$_6$H$_5$)]$_4$, Pd[AsCl$_2$(C$_2$H$_5$)]$_4$,
Pd[PCl$_2$(cyclo-C$_6$H$_{11}$)]$_4$, Pd[PCl(C$_2$H$_5$)$_2$]$_4$,
Pd[AsCl(n-C$_4$H$_9$)$_2$]$_4$, Pd[PCl(OC$_6$H$_5$)$_2$]$_4$, and
Pd[SbCl(C$_6$H$_5$)$_2$]$_4$.

(2) Palladium complex compounds expressed by the general formula PdA$^1$A$^2$L$^1$L$^2$ wherein A$^1$ and A$^2$ represent a hydrogen atom, a halogen atom, NO$_3$, CNS, R$^4$, R$^4$CO or R$^4$COO, and R$^4$, L$^1$ and L$^2$ are as defined above.

Specific examples of compounds of this group are as follows:
PdCl$_2$(PCl$_3$)$_2$, PdBr$_2$(PCl$_3$)$_2$, PdCl$_2$[P(C$_6$H$_5$)$_3$]$_2$,
PdCl$_2$[P(CH$_3$)$_3$]$_2$, PdCl$_2$[P(OCH$_3$)$_3$]$_2$,
PdBr$_2$[P(C$_6$H$_5$)$_3$]$_2$, PdBr$_2$[P(cyclo-C$_6$H$_{11}$)$_3$]$_2$,
Pd(NO$_3$)$_2$[P(C$_6$H$_5$)$_3$]$_2$, Pd(CNS)$_2$[P(C$_4$H$_9$)$_3$]$_2$,
PdCl$_2$[As(C$_4$H$_9$)$_3$]$_2$, PdCl$_2$[As(C$_6$H$_5$)$_3$]$_2$,
PdCl$_2$[Sb(C$_6$H$_5$)$_3$]$_2$, PdBr$_2$[Sb(C$_3$H$_7$)$_3$]$_2$,
PdCl(CH$_3$CO)[P(C$_3$H$_5$)$_3$]$_2$,
PdCl(C$_6$H$_5$CO)[P(C$_2$H$_5$)$_3$]$_2$,
PdBr(CH$_3$)[P(C$_2$H$_5$)$_3$]$_2$, Pd(CH$_3$)$_2$[P(C$_2$H$_5$)$_3$]$_2$, and
Pd[P(C$_6$H$_5$)$_3$]$_2$(OOCCH$_3$)$_2$.

(3) Palladium complex compounds expressed by the general formula PdL$^1$L$^2$Q wherein Q represents a dienophile such as maleic anhydride, maleic acid esters, fumaric acid esters, fumaronitrile, benzoquinone, naphthoquinone or acetylene dicarboxylic acid esters, and L$^1$ and L$^2$ are as defined hereinabove.

Specific examples are as follows:

L$^1$L$^2$ in the palladium complex compounds (1) to (3) may be a bidentate ligand of the general formula wherein M represents P, As or Sb; R$^7$, R$^8$, R$^9$ and R$^{10}$ represent R$^1$, R$^2$, R$^3$, OR$^4$, OR$^5$ or OR$^6$ defined hereinabove; and R$^{11}$ represents a divalent hydrocarbon group.

Specific examples of these bidentate ligands are as follows:
(CH$_3$)$_2$P(CH$_2$)$_2$P(CH$_3$)$_2$, (C$_2$H$_5$)$_2$P(CH$_2$)$_3$P(C$_2$H$_5$)$_2$,
(cyclo-C$_6$H$_{11}$)$_2$P(CH$_2$)$_3$P(cyclo-C$_6$H$_{11}$)$_2$,
(n-C$_4$H$_9$)$_2$PCH$_2$P(n-C$_4$H$_9$)$_2$,
(C$_6$H$_5$CH$_2$)$_2$P(CH$_2$)$_2$P(CH$_2$C$_6$H$_5$)$_2$,
(C$_6$H$_5$)$_2$P(CH$_2$)$_2$P(C$_6$H$_5$)$_2$,
(C$_6$H$_5$O)$_2$PCH$_2$P(OC$_6$H$_5$)$_2$,
(NCCH$_2$CH$_2$)$_2$P(CH$_2$)$_3$P(CH$_2$CH$_2$CN),
(C$_6$H$_5$)$_2$P(CH$_2$)$_4$P(C$_6$H$_5$)$_2$,
(C$_2$H$_5$)$_2$PCH=CHP(C$_2$H$_5$)$_2$,

(CH$_3$)$_2$As(CH$_2$)$_2$As(CH$_3$)$_2$,
(n-C$_4$H$_9$)$_2$As(CH$_2$)$_3$As(n-C$_4$H$_9$)$_2$,
(cyclo-C$_6$H$_{11}$)$_2$As(CH$_2$)$_2$As(cyclo-C$_6$H$_{11}$)$_2$,
(C$_6$H$_5$)$_2$AsCH$_2$As(C$_6$H$_5$)$_2$,
(C$_6$H$_5$)$_2$As(CH$_2$)$_2$As(C$_6$H$_5$)$_2$,
(C$_2$H$_5$)$_2$As(CH$_2$)$_4$As(C$_2$H$_5$)$_2$, (CH$_3$)$_2$Sb(CH$_2$)$_2$Sb(CH$_3$)$_2$,
(i-C$_3$H$_7$)$_2$Sb(CH$_2$)$_3$Sb(i-C$_3$H$_7$)$_2$,
(cyclo-C$_6$H$_{11}$)$_2$Sb(CH$_2$)$_2$Sb(cyclo-C$_6$H$_{11}$)$_2$,
(C$_6$H$_5$)$_2$SbCH$_2$Sb(C$_6$H$_5$)$_2$,
(C$_6$H$_5$)$_2$Sb(CH$_2$)$_4$Sb(C$_6$H$_5$)$_2$, (4) Palladium complex compounds expressed by the general formula PdA¹YL¹ wherein Y is a π-allyl group of the general formula wherein $R^{12}$, $R^{13}$, $R^{14}$, $R^{15}$ and $R^{16}$ represent a hydrogen or halogen atom, a $C_{1-16}$ alkyl, alkenyl, cycloalkyl, cycloalkenyl or aryl group, or derivatives of these; and $A^1$ and $L^1$ are as defined hereinabove.

Specific examples of these compounds are as follows:

(5) Palladium complex compounds expressed by the general formula $[PdX^1X^2Z]_2$ wherein $X^1$ and $X^2$ represent a halogen atom, and Z represents an olefin having 1 to 20 carbon atoms. The olefin denotes a monolefin such as an α-olefin, iso-olefin or internal olefin, a diolefin, a polyolefin, a vinyl compound, or derivatives of these.

Specific examples of these palladium compounds are as follows:

$[PdCl_2(CH_2=CH_2)]_2$,

-continued $[PdBr_2(CH_2=CH\ )]_2$, and (6) Palladium compounds expressed by the general formula $PdX^1X^2D$ wherein D represents a diene such as butadiene, cyclopentadiene or cyclooctadiene, derivatives of these dienes, or carbon monoxide; and $X^1$ and $X^2$ represent a halogen atom.

Specific examples of these palladium compounds are as follows:

$Pd(CO)Cl_2$, $PdCl_2(CH_2=CH-CH=CH_2)$,

(7) Palladium complex compounds expressed by the general formula $PdB^1B^2$ wherein $B^1$ and $B^2$ represent D or Y defined hereinabove.

Specific examples of these compounds are as follows:

(8) Palladium complex compounds expressed by the general formula $[PdX^1Y]_2$ wherein $X^1$ and Y are as defined hereinabove.

Specific examples of these compounds are as follows:

$[(\pi\text{-}C_3H_5)PdCl]_2$, $[(\pi\text{-}C_3H_5)PdBr]_2$,

-continued (9) Palladium compounds expressed by the general formula $$Pd(O-\underset{\underset{O}{\|}}{C}-R^4)_2$$

wherein $R^4$ is as defined above.

Specific examples of these compounds are $Pd(OOCCH_3)_2$, $Pd(OOCC_3H_5)_2$, $Pd(OOCC_3H_7)_2$, and $Pd(OOCC_6H_5)_2$.

(10) Palladium compounds expressed by the general formula $Pd(OR^4)_2$ wherein $R^4$ is as defined hereinabove.

Specific examples are $Pd(OH)_2$, $Pd(OCH_3)_2$, $Pd(OC_2H_5)_2$, $Pd(O\ i\text{-}C_3H_7)_2$, $Pd(O\ t\text{-}C_4H_9)$, and $Pd(OC_6H_5)$.

(11) Palladium compounds expressed by the general formula $Pd[OCR^4{=}CH\text{-}COR^5]_2$ wherein $R^4$ and $R^5$ are as defined above.

Specific examples of these compounds are $Pd[OCH{=}CH\text{-}COCH_3]_2$, $Pd[OC(CH_3){=}CH\text{-}COCH_3]_2$, and $Pd[OC(CH_3){=}CH\text{-}COC_2H_5]_2$.

(12) Palladium compounds expressed by the general formula $Pd(R^{17}NC)_4$, $PdX_2(R^{17}NC)_2$, $Pd(R^{17}NC)_2$ or $PdX_2(R^{17}CN)_2$ wherein X represents a halogen atom, and $R^{17}$ represents a $C_{1-16}$ alkyl, alkenyl, cycloalkyl, cycloalkenyl or aryl group, or derivatives of these.

Specific examples of these compounds are $Pd(para\text{-}CH_3C_6H_4NC)_4$, $Pd(CH_3NC)_2$, $Pd(para\text{-}OCH_3\text{-}C_6H_4NC)_4$, $PdCl_2\text{-}(C_6H_5NC)_2$, and $PdCl_2(C_6H_5CN)_2$.

(13) Inorganic salts or oxide of palladium. Specific examples are $PdI_2$, $PdCl_2$, $PdBr_2$, $Pd(CN)_2$, $Pd(CNS)_2$, $Pd(NO_3)_2$, $PdSO_4$, $PdO$, $PdI_4$, $PdCl_4$, $PdBr_4$, $PdS_2$ and $PdSe_2$.

(14) Complexes of the palladium compounds (1) to (13) with amines or inorganic compounds.

Specific examples of these compounds are as follows:

$Pd(NO_2)_2(NH_3)_2$, $Na_2PdCl_4$, $K_2PdCl_4$, $K_2PdBr_4$, $K_2Pd(CN)_4$, $(NH_4)_2PdCl_4$, $H_2(PdCl_4)_2$, $H_2(PdCl_6)_2$, $Na_2PdCl_6$, $K_2PdCl_6$, $(NH_4)_2PdCl_6$, $PdCl_4(NH_3)_2$, and $K_2Pd(CN)_4$.

(15) Palladium compounds (1) to (14) above as supported on carriers. All carriers which are used to support metallic palladium can be applied.

The amount of the catalyst used in this invention is at least 0.0001 mole per mole of the starting amine. For commercial operations, amounts in the range of 0.0001 to 0.5 mole, preferably 0.001 to 0.2 mole, are suitable. If the amount of the catalyst is smaller than the lower limit, the reaction time is prolonged to cause commercial disadvantage. When the amount of the catalyst is too large, the molecular weight of the product is reduced, but there is no other appreciable adverse effect on the reaction. However, separation and recovery of the excessive catalyst requires more labor and time.

The reaction in accordance with this invention proceeds easily even in the absence of solvent. For convenience, a solvent may be used. Any compounds which act as solvent without hampering the reaction can be used in this invention as the solvent. Specific examples of the solvent are aromatic hydrocarbons such as benzene, toluene or xylene, aliphatic hydrocarbons such as n-pentane, n-hexane and n-heptane, alicyclic hydrocarbons such as cyclohexane, cyclooctane and methylcyclohexane, ethers such as diethyl ether, diisopropyl ether, tetrahydrofuran, dioxane and dimethoxyethane, and esters such as ethyl acetate, butyl acetate, ethyl propionate and ethyl butyrate.

The reaction in accordance with this invention can be performed at 50° to 300° C., preferably 120° to 250° C. Too low reaction temperature are commercially disadvantageous because the reaction time is prolonged, and too high reaction temperatures, on the other hand, will increase the formation of by-products. The reaction time is usually at least 5 minutes, preferably from 15 minutes to 100 hours. The reaction proceeds favorably by stirring or shaking, and the rate of reaction is considerably affected by the amount of the catalyst, the reaction temperature, the rate of stirring, etc. The reaction pressure may be atmospheric pressure. The reaction can also be performed under elevated pressures using ammonia or nitrogen.

The reaction in accordance with this invention can be performed either batchwise or continuously. Alternatively, a semi-batchwise method can be used in which hexamethylenediamine is added consecutively.

Since in the present invention by-products such as water and salts are not formed, the desired polyalkylenimine can be easily separated by simply separating the catalyst by filtration using a solvent, etc. The catalyst separated can be re-used repeatedly.

When the process of this invention described hereinabove is performed using a mixture of hexamethylenediamine and at least one amine of the general formula

(I)

wherein m is an integer of 2 to 9, and n is an integer of 1 to 5 with the proviso that when m is 6, n is not 1, instead of the hexamethylenediamine alone, a copolymer (to be referred to hereinbelow as copolyalkylenimine) having a unit of the formula $+(CH_2)_6NH+$ and a unit of the general formula

(m and n are as defined above) can be obtained.

Examples of amines of the formula which can be co-condensed with hexamethylenediamine include ethylenediamine, 1,3-diaminopropane, 1,4-diaminobutane, 1,5-diaminopentane, 1,9-diaminononane, diethylenetriamine, triethylenetetramine, tetraethylenepentamine, pentaethylenehexamine, dipropylenetriamine, and tripropylenetetramine.

The ratio of the amine of the general formula to hexamethylenediamine used in the co-condensation reaction can be varied according to the purpose. Suitably, it is from 1:100 to 100:1, preferably from 1:10 to 10:1.

The amount of the catalyst in the co-condensation method of this invention is at least 0.0001 mole, preferably 0.0001 to 0.5 mole, more preferably 0.001 to 0.2 mole, per mole of the amine.

When hexamethylenediamine is co-condensed with the amine of general formula (I) by a semi-batchwise method, one or both of these compounds are consecutively fed into the reaction system. Alternatively, a blocked copolymer may be prepared by first completing the condensation of one of the amines and adding the other amine after completion of the condensation of the first-named amine.

The use of the processes of this invention described hereinabove can afford either polyhexamethylenimines or copolyalkylenimines of high degrees of polymerization or those of low degrees of polymerization. Specifically, polyhexamethylenimines or copolyalkylenimines of low degrees of polymerization and high degrees of polymerization with an average degree of polymerization of at least 3 can be produced as desired by changing the reaction conditions such as the reaction temperature, the reaction time or the amount of the catalyst. Furthermore, the amounts of by-products such as hexamethylenimine are very small, and the desired polyhexamethylenimine or copolyalkylenimine can be produced with high selectivity and in high yields. For example, products of low degrees of polymerization can be obtained when the amount of the catalyst is increased, and products of high degree of polymerization can be obtained when the amount of the catalyst is decreased.

Some of the polyhexamethylenimines obtained by the process of the present invention contain a recurring unit of the formula and have a molecular weight of at least 1000. These polyhexamethylenimines are novel compounds.

These novel polyhexamethylenimines of the invention are preferably linear polymers. The linear polymers, as referred to herein, mean polymers in which at least 70% of the entire amines in the polymer molecule consists of secondary amino groups (—NH—). In other words, they denote polymers in which at least 70% of the recurring units contained in the polymer molecule consists of the recurring unit of formula (II) given above.

The molecular weight of polymer is a number average molecular weight measured by using a vapor pressure osmometer.

Known hexamethylenimine polymers, for example polyhexamethylenimine obtained by ring-opening polymerization of a cyclic hexamethylenimine monomer (German Pat. No. 1037126), or an oligomer of hexamethylenimine formed as a by-product in the synthesis of hexamethylenimine monomer by hydrogenating ε-caprolactam with a cobalt catalyst (T. Ayusawa and T. Shimodaira, Ind. Eng. Chem. Prod. Res. Dev., 15, 295 (1976)), have a molecular weight of as low as less than 500. The polyhexamethylenimine obtained by the ring-opening polymerization of cyclic hexamethylenimine is a penta- to hexa-mer, and the oligomer of hexamethylenimine formed as a by-product in the catalytic hydrogenation reaction of ε-caprolactam is a tri- to tetra-mer. The polyhexamethylenimine obtained by the ring-opening polymerization of cyclic hexamethylenimine contains more tertiary amino groups than secondary ones in the polymer molecule, and is not a linear polymer.

The novel polyhexamethylenimine of this invention have a molecular weight of at least 1,000, which is far higher than those of the polymers or oligomers of hexamethylenimine described in the above-cited literature references. Elemental analysis, infrared absorption spectrum, $^1$H-NMR, and $^{13}$C-NMR have shown that the novel polyhexamethylenimines of the present invention are polyamines in which hexamethylenimine units $-[(CH_2)_6NH]-$ are recurring in chain. It has also been found from the quantitative analysis of primary, secondary and tertiary amines and the measurement of molecular weight by a vapor pressure osmometer method that these polymers are polyamines which are substantially linear and little branched and have a molecular weight of at least 1,000, usually 1,000 to 20,000.

In the accompanying drawings.

The polyhexamethylenimines of the invention having a molecular weight of at least 1,000 have the unique property of rapidly gelling hydrocarbons such as benzene or kerosene in the presence of water. Other known polyalkylenimine such as polyethylenimine are not known to have the property of gelling hydrocarbons in the presence of water.

It has been discovered that not only the novel polyhexamethylenimines of the invention, but also other polyhexamethylenimines of the invention having a degree of polymerization of at least 3, preferably a number average molecular weight of 500 to 20,000, have properties very similar to those of polyethylenimine, and the unique property, not possessed by polyethylenimine, of gelling liquid organic compounds, especially hydrocarbon compounds, at room temperature. Moreover, it has been found that the hydrocarbon compound gel are liquefied by heating, and will be reversibly gelled when the temperature is returned to room temperature.

It has thus been found by the present inventors that polyhexamethylenimines, preferably polyhexamethylenimine having a number average molecular weight of 500 to 20,000, have very good properties as solidifying agents for organic compounds which are liquid at room temperature.

Accordingly, the present invention embraces a solidifying agent capable of solidifying a liquid organic compound, said agent comprising as an active ingredient a polyalkylenimine having the structure unit of the formula $\text{-[(CH}_2\text{)}_6\text{NH]-}$ and a method for solidifying liquid organic compounds, which comprises adding the solidifying agent to a normally liquid organic compound.

When the molecular weight of the polyhexamethylenimine used as a solidifying agent in this invention is too low, the gelling ability of the polymer is insufficient. If, on the other hand, its molecular weight is too high, its synthesis is difficult, and its solubility in organic compounds or the rate of dissolving is insufficient.

The amount of the polyhexamethylenimine used in this invention to solidify the organic compound varies depending upon the type of the organic compound, and the strength of the desired solidified compound. It is generally 0.1 to 20 parts by weight, preferably 0.3 to 10 parts by weight, per 100 parts by weight of the organic compound. In adding the solidifying agent, there is no particular limitation on the temperature. Usually, the organic compound can be conveniently solidified by mixing it with the solidifying agent at a temperature of 0° to 200° C., preferably 10° to 100° C.

In a water-free condition, the solidifying agent of this invention cannot solidify liquid organic compounds. When it is used in contact with water, for example in the air, it rapidly solidifies the liquid organic compounds even if the amount of water present is small. The amount of water required at the time of solidification is 0.02 to 200 parts by weight, preferably 0.05 to 100 parts by weight, per 100 parts by weight of the organic compound. If the amount of water is too small, the rate of solidification is retarded, and when the amount of water is too large, the solidifying agent forms an emulsion, and hence, the strength of the solidified product is reduced. There is no particular restriction on the time of adding water. For example, water may be added after mixing the organic compound with the polyhexamethylenimine. Or the polyhexamethylenimine may be added to a mixture of water and the organic compound. Alternatively water and polyhexamethylenimine may be simultaneously added to the organic compound, or a mixture of water and polyhexamethylenimine may be added to the organic compound.

The temperature at which to add water to the organic compound is not particularly restricted.

Solidification of the liquid organic compound using the solidifying agent of this invention is usually carried out at a temperature of not more than 50° C. Generally, the rate of solidification is faster at lower solidification temperatures.

Examples of organic compounds which can be solidified by using the solidifying agent of this invention are listed below.

(i) Aliphatic hydrocarbons, aromatic hydrocarbons and alicyclic hydrocarbons which are liquid at room temperature, such as hexane, heptane, benzene, toluene, styrene, cyclohexane, gasoline, kerosene, light oils, heavy oils, lubricating oils, and crude oils.

(ii) Ester compounds which are liquid at room temperature, such as animal and vegetable oils and fats, and synthetic esters such as acrylic or methacrylic acid esters, vinyl acetate and prepolymers of unsaturated polyester resins.

(iii) Halogenated hydrocarbons which are liquid at room temperature, such as chlorobenzene or methylene chloride.

The strength of the liquid organic compound solidified by the solidifying agent of this invention depends upon the amount of the solidifying agent and the amount of water. Generally, the solidified product is in the form of jelly to block at room temperature. When heated to a higher temperature, it becomes liquid, but on cooling it is again solidified.

Methods heretofore suggested for solidifying hydrocarbons which are liquid at room temperature include, for example, (i) the addition of a metal soap and water, (ii) the addition of benzylidene sorbitol, and (iii) the addition of an N-acylaminoacid amide, ester or amine salt. These methods, however, suffer from one or more difficulties. For example, a large amount of the gelling agent is required. Or it is necessary to stir the liquid organic compound and the gelling agent vigorously. The gelling agent is scarcely soluble in the liquid organic compound. Or the heat stability of the gelling agent is low. Thus, none of these methods are entirely satisfactory.

The solidifying agent of this invention removes these defects of the conventional gelling agents, and can find a wide range of applications. For example, when the solidifying agent is sprayed onto an oil which has flowed out, the oil is solidified by moisture in the air or by sea water and can be recovered without causing hazards. Furthermore, when the solidifying agent of this invention is added to low-boiling fuel oils such as a fuel oil for jet airplanes, the oil gels by the moisture in the air in the event it comes out of the container, and an accident such as explosion can be prevented. A solid fuel can be made by adding the solidifying agent of the invention and water to liquid paraffin to make it portable. It is also possible to form a moderately flowable gel of a reactive monomer such as styrene or a methacrylic or acrylic acid ester by adding the solidifying agent of this invention and water, coat it on a substrate, and polymerize the coated film by ultraviolet irradiation, etc. This technique can be conveniently used for inks and paints. Furthermore, since the organic compound solidified by using the solidifying agent of this invention has a markedly reduced vapor pressure, it can be conveniently used to inhibit the evaporation of volatile organic solvents. For example, when the solidifying agent of the invention is added to a paint remover and the mixture is applied to a coated surface, the solvent gels by the moisture in the air and its evaporation can be inhibited. Thus, the paint removing operation can be effectively carried out.

In addition to the applications described above, the polyhexamethylenimine obtained by the process of this invention is also useful as a modifier for polyamides, polyesters, alkyd resins and waxes, a dyeing improver for fibers and leathers, a raw material for ion exchange resins, an emulsion inhibitor, a surface active agent, an antistatic agent, and a coagulating agent.

The copolyalkylenimine can be used in the same applications as described above. By varying the proportion and type of the comonomer copolymers suitable for various other applications can be prepared.

Specifically, by co-condensing the amine of the general formula and hexamethylenediamine in optional proportions, copolyalkylenimine having various different properties can be obtained. When the amount of ethylenediamine is large in the co-condensation of ethylenediamine and hexamethylenediamine, the resulting copolyalkylenimine is hydrophilic, and has such a high molecular weight as cannot be obtained by the condensation of ethylenediamine alone.

Accordingly, the copolyalkylenimine produced by the present invention may have a hydrophilic group such as an ethylenimine unit or propylene imine unit introduced into it in order to impart more hydrophilicity to polyhexamethylenimine, or an oleophilic group such as a heptamethylenimine unit or octamethylenimine unit introduced into it in order to impart oleophilicity. The process of this invention is significantly characterized by the fact that these hydrophilic or oleophilic groups can be introduced in any desired proportions, and moreover, by using a special polymerization method, the manner of arranging such groups in a single polymer chain can be controlled.

The following Examples specifically illustrate the present invention. They should not be construed as limiting the invention. All parts and percentages in these Examples are by weight unless otherwise specified.

EXAMPLE 1

A nitrogen-purged 500 ml stainless steel autoclave was charged with 116 g of hexamethylenediamine and 5.3 g of palladium black, and with stirring, they were heated at 160° C. for 30 hours. As the heating proceeded, ammonia was generated, and the internal pressure of the autoclave increased. Thus, the ammonia was released occasionally to maintain the pressure of the reaction system at less than 6 kg/cm$^2$. After the reaction, the reaction mixture was cooled, and the contents of the autoclave were dissolved in methanol. The catalyst was separated by filtration, and methanol and low-boiling substances were distilled off under reduced pressure to afford 95 g of a yellowish white polymer. The amount of ammonia generated in this reaction was 0.98 mole per mole of hexamethylene diamine.

The polymer had an average molecular weight, measured for its benzene solution by a vapor pressure osmometer, of 1,315, and an intrinsic viscosity, determined for its chlorobenzene solution at 30° C., of 0.11. The elemental analysis values of this polymer were as follows:

C: 73.8%, N: 13.3%, H: 12.5%

Figure 1:
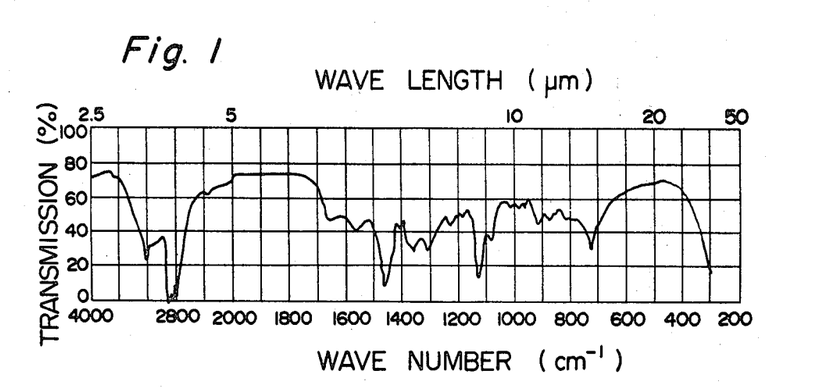
FIG. 1 is an infrared absorption spectrum of polyhexamethylenimine obtained in Example 1.
Figure 4:
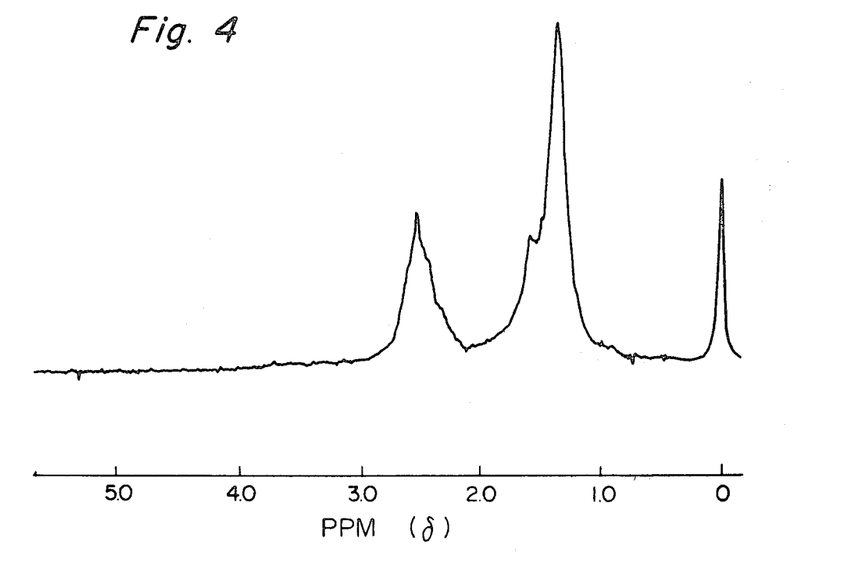
FIG. 4 is a $^1$H-NMR spectrum of polyhexamethylenimine obtained by the method of Example 12.

The amines of this polymer were quantitatively analyzed in accordance with the method of S. Siggia, J. G. Hanna, I. R. Kerrenski: Anal. Chem., 22, 1295 (1950). The results were: primary amine 2.9 mole%; secondary amine 84.0 mole%; tertiary amine 13.1 mole%. The infrared absorption spectrum of the resulting polymer is shown in FIG. 1. The $^1$H-NMR spectrum of this polymer was almost the same as that of the polymer obtained in Example 12 which is shown in FIG. 4.

From the above results of analyses, the polymer obtained by the aforesaid reaction was determined to be polyhexamethylenimine having the recurring unit $-[(CH_2)_6-MH]-$ One part of the polyhexamethylenimine obtained was mixed with 25 parts of methyl methacrylate. The mixture was transferred into a beaker containing 0.1 part of water, and allowed to stand in the air for 2 hours at room temperature. A jelly-like gel formed.

One part of the polyhexamethylenimine was mixed with 25 parts of light oil. The mixture was transferred into a beaker containing 0.1 part of sea water, and allowed to stand in the air for 4 hours at room temperature. A jelly-like gel formed.

EXAMPLE 2

A nitrogen-purged 500 ml stainless steel autoclave was charged with 116 og of hexamethylenediamine and 5.4 g of palladium black, and with stirring, they were heated at 161° C. for 98 hours. As the heating proceeded, ammonia was generated, and the internal pressure of the autoclave increased. Thus, the ammonia was occasionally released to maintain the pressure of the reaction system at less than 5 kg/cm$^2$. After the reaction, the reaction mixture was cooled, and the contents of the autoclave were dissolved in methanol. The catalyst was separated by filtration, and methanol and low-boiling products were distilled off under reduced pressure to afford 95 g of a yellowish white polymer. The amount of ammonia generated in this reaction was 0.99 mole per mole of hexamethylenediamine.

The polymer had an average molecular weight, measured for its benzene solution by a vapor pressure osmometer, of 1,820. Elemental analysis of the polymer gave the following results.

C: 73.2%, N: 13.9%, H: 12.9%

The results of the quantitative analysis of amines of this polymer were as follows: primary amine 1.9 mole%, secondary amine 85.4 mole%, tertiary amine 12.7 mole%.

Figure 2:
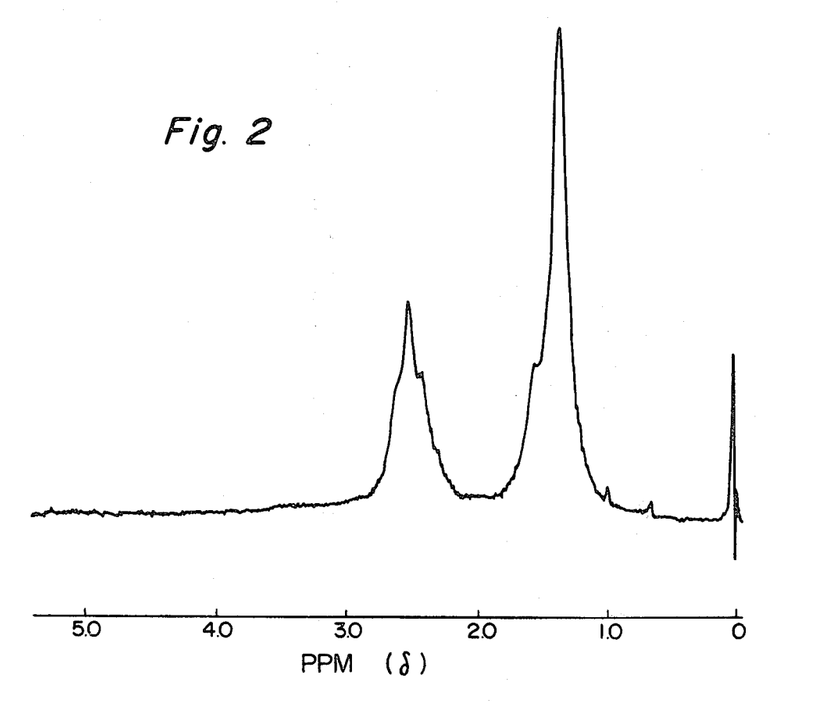
FIG. 2 is an NMR spectrum of polyhexamethylenimine obtained in Example 1.

The $^1$H—NMR spectrum of the resulting polymer is shown in FIG. 2.

From the above results of analyses, the polymer obtained by the aforesaid reaction was determined to be poluhexamethylenimine having the recurring unit $-[(CH_2)_6-NH]-$ One part of the resulting polyhexamethylenimine was mixed with 50 parts of liquid paraffin. The mixture was allowed to stand in the air at room temperature for 1 hour. A jelly-like gel formed.

One part of the resulting polyhexamethylenimine was mixed with 50 parts of soybean oil. The mixture was allowed to stand in the air at room temperature for 1 hour. A jelly-like gel formed.

EXAMPLE 3

A nitrogen-purged 500 ml stainless autoclave was charged with 115 g of hexamethylenediamine and 5.4 g of palladium black, and with stirring, they were heated at 200° C. for 5 hours. As the heating proceeded, ammonia was generated, and the internal pressure of the autoclave increased. Thus, the ammonia was released occasionally to maintain the pressure of the reaction system at less than 8 kg/cm$^2$. After the reaction, the reaction mixture was cooled, and the contents of the autoclave were dissolved in methanol. The catalyst was separated by filtration, and methanol and low-boiling products were distilled off under reduced pressure to afford 94 g of polyhexamethylenimine having an average molecular weight of 950.

The polymer was mixed with hot hexane, and the insoluble portion of the polymer was separated by filtration. The residue was dried under reduced pressure to afford 21 g of polyhexamethylenimine having an average molecular weight of 2,040. When hexane was distilled off under reduced pressure from the filtrate, 82 g of polyhexamethylenimine having an average molecular weight of 540 was obtained.

One part of the hot hexane-insoluble polyhexamethylenimine having an average molecular weight of 2,040 was mixed with 100 parts of benzene. When the mixture was allowed to stand in the air at room temperature for 2 minutes, a butterlike solid gel formed.

One part of the hot hexane-soluble polyhexamethylenimine having an average molecular weight of 540 was mixed with 5 parts of benzene. The mixture was transferred to a beaker containing 0.1 part of water, and allowed to stand at room temperature for 1 day. A pudding-like gel formed, which easily disintegrated upon touching lightly by a finger.

One part of the low-boiling product having an average molecular weight of 142 which had been distilled off under reduced pressure together with methanol during the after-treatment of the reaction mixture was mixed with 5 parts of each of benzene, kerosene, heavy oil and crude oil. The mixture was transferred into a beaker containing 0.1 part of water, and allowed to stand at room temperature for 1 month. No gellation was noted in any of the mixtures tested.

EXAMPLE 4

A dried and nitrogen-purged 500 ml stainless steel autoclave was charged with 115 g of hexamethylenediamine and 26.1 g of palladium black, and with stirring, they were mixed at 130° C. for 20 hours. After the reaction, the reaction mixture was worked up in the same way as in Example 1 to afford 95 g of polyhexamethylenimine having an average molecular weight of 989.

EXAMPLE 5

A dried and nitrogen-purged 500 ml stainless steel autoclave was charged with 117 g of hexamethylenediamine and 5.3 g of palladium black, and with stirring, they were heated at 220° C. for 30 minutes. Eighty-five percent of the hexamethylenediamine charged was reacted. After the reaction, the reaction mixture was worked up in the same way as in Example 1 to afford 80 g of polyhexamethylenimine having an average molecular weight of 553.

One part of the resulting polyhexamethylenimine was mixed with 10 parts of gasoline. The mixture was transferred into a beaker containing 0.1 part of water, and allowed to stand in the air at room temperature for 1 day. A pudding-like gel formed.

EXAMPLE 6

A dried and nitrogen-purged 500 ml stainless steel autoclave was charged with 115 g of hexamethylenediamine, 200 ml of benzene and 5.4 g of palladium black, and they were heated at 180° C. for 40 hours. After the reaction, the benzene was distilled off to afford 92 g of polyhexamethylenimine having an average molecular weight of 1,430.

One part of the resulting polyhexamethylenimine was mixed with 50 parts of styrene. When the mixture was allowed to stand in the air at room temperature for 1 hour, a pudding-like gel formed.

EXAMPLE 7

A dried and nitrogen-purged 500 ml stainless steel autoclave was charged with 117 g of hexamethylenediamine and 11.2 g of palladium acetate, and with stirring, they were heated at 161° C. for 32 hours. After the reaction, the reaction mixture was worked up in the same way as in Example 1 to afford 94.5 g of polyhexamethylenimine having an average molecular weight of 1,100.

EXAMPLE 8

A dried and nitrogen-purged 500 ml stainless steel autoclave was charged with 116 g of hexamethylenediamine and 8.7 g of palladium chloride, and with stirring, they were heated at 160° C. for 31 hours. After the reaction, the reaction mixture was worked up in the same way as in Example 1 to afford 91 g of polyhexamethylenimine having an average molecular weight of 1,121.

EXAMPLE 9

A dried and nitrogen-purged 500 ml stainless steel autoclave was charged with 116 g of hexamethylenediamine and 11.5 g of tetrakis(triphenylphosphine)palladium, and they were heated at 163° C. for 80 hours. After the reaction, the reaction mixture was worked up in the same way as in Example 1 to afford 90 g of polyhexamethylenimine having an average molecular weight of 1,213.

EXAMPLE 10

A dried and nitrogen-purged 500 ml stainless steel autoclave was charged with 115 g of hexamethylenediamine and 55 g of a catalyst resulting from supporting 11% palladium black on molecular sieve. With stirring, they were heated at 170° C. for 39 hours. After the reaction, the reaction mixture was worked up in the same way as in Example 1 to afford 94 g of polyhexamethylenimine having an average molecular weight of 1,410.

EXAMPLE 11

A dried and nitrogen-purged 500 ml stainless steel autoclave was charged with 117 g of hexamethylenediamine and 50 g of a catalyst resulting from supporting 5% palladium black on α-alumina, and with stirring, they were heated at 160° C. for 40 hours. After the reaction, the reaction mixture was worked up in the same way as in Example 1 to afford 97 g of polyhexamethylenimine having an average molecular weight of 1,510.

EXAMPLE 12

A nitrogen-purged 500 ml stainless steel autoclave was charged with 117 g of hexamethylenediamine and 5.1 g of palladium black, and with stirring, they were heated at 165° C. for 29 hours. As the heating proceeded, ammonia was generated, and the internal pressure of the autoclave increased. Thus, the ammonia was released occasionally to maintain the pressure of the reaction system at less than 5 kg./cm$^2$. After the reaction, the reaction mixture was cooled, and the contents of the autoclave were dissolved in methanol. The catalyst was separated by filtration, and methanol and low-boiling products were distilled off under reduced pressure to afford 89 g of a yellowish white polymer. The amount of ammonia generated in this reaction was 0.99 mole per mole of hexamethylenediamine.

The polymer had an average molecular weight, measured for its benzene solution by a vapor pressure osmometer, of 1,364. The elemental analysis values of this polymer were as follows:

C: 73.57%, N: 13.32%, H: 13.11%.

From the above elemental analysis values, the composition formula (empirical formula) of the polymer was $C_{6.5}H_{13.8}N_1$.

The amines of this polymer were quantitatively analyzed in accordance with the method of S. Siggia. The results were as follows: primary amine 2.1 mole%, secondary amine 84.9 mole%, tertiary amine 13.0 mole%.

Figure 3:
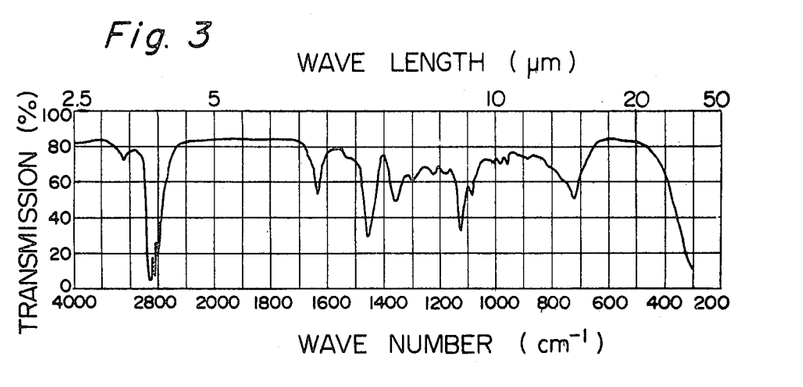
FIG. 3 is an infrared absorption spectrum of polyhexamethylenimine obtained by the method of Example 12.

The infrared absorption spectrum of the resulting polymer is shown in FIG. 3, and its $^1$H—NMR spectrum, in FIG. 4.

The infrared absorption spectrum of the polymer showed absorptions at 3250, 1460 and 1127 cm$^{-1}$ characteristic of the secondary amine, and an absorption at 725 cm$^{-1}$ characteristic of a zigzag methylene chain consisting of at least 4 carbon atoms. Its $^1$H—NMR spectrum showed an absorption of methylene proton at the α-position of amino group at δ2.52 ppm, and absorptions of protons of other methylenes and amine at δ1.1–1.8 ppm. The area ratio of these absorptions was 1:2.15.

From the above results of analyses, this polymer was determined to be a linear polymer having the recurring unit One part of the resulting polymer was mixed with 25 parts of each of benzene, styrene, kerosene, heavy oil and crude oil. The mixture was transferred into a breaker containing 0.1 part of water, and allowed to stand at room temperature for 1 hour. A pudding-like gel formed in either case.

A mixture of 1 part of the polymer and 25 parts of benzene was placed in a dried and nitrogen-purged flask, and sealed. It was allowed to stand for 1 month at room temperature in this state. No gel was seen to form.

EXAMPLE 13

A nitrogen-purged 500 ml stainless steel autoclave was charged with 230 g of hexamethylenediamine and 13 g of tetrakis(triphenylphosphine)palladium, and with stirring, they were heated at 173° C. for 98 hours. As the heating proceeded, ammonia was generated, and the internal pressure of the autoclave increased. Thus, the ammonia was released occasionally to maintain the pressure of the reaction system at less than 6 kg/cm$^2$. After the reaction, the reaction mixture was cooled, and the contents of the autoclave were dissolved in methanol. The catalyst was separated by filtration, and methanol and low-boiling products were distilled off under reduced pressure. The residue was mixed with hot hexane, and the insoluble portion of the polymer was separated by filtration to afford 53 g of a polymer.

The polymer had an average molecular weight, as measured for its benzene solution by a vapor pressure osmometer, of 2,901. The elemental analysis values of the polymer were as follows:

C: 73.13%, N: 13.56%, H: 13.21%

The composition formula of the polymer was therefore $C_{6.3}H_{13.6}N_1$.

The amines of the polymer were quantitatively analyzed, and the results were as follows:
Primary amine 1.8 mole%
Secondary amine 91.5 mole%
Tertiary amine 6.7 mole%

The infrared absorption spectrum and $^1$H—NMR spectrum of the polymer were almost the same as FIGS. 3 and 4 of Example 12.

Accordingly, this polymer is considered to be a substantially linear polymer having the recurring unit $-[(CH_2)_6-NH]-$ One part of the resulting polymer was mixed with 50 parts of light oil. The mixture was transferred to a beaker containing 0.1 part of water, and allowed to stand in the air at room temperature for 30 minutes. A pudding-like gel formed.

Comparative Example 1

A nitrogen-purged 500 ml stainless steel autoclave was charged with 150 g of hexamethylenimine and 21 g of 47% boron trifluoride ethyl ether, and with stirring, they were heated at 270° C. for 24 hours. After the reaction, the reaction mixture was cooled, and the contents of the autoclave were mixed with a 20% aqueous solution of sodium hydroxide and 200 ml of benzene in a beaker. The mixture was allowed to stand for 1 day. The upper layer was withdrawn, and washed several times with a large quantity of water. The unreacted hexamethylenimine and low-boiling products were distilled off under reduced pressure to afford 54 g of a reddish brown viscous polymer.

The polymer had an average molecular weight, as measured for its benzene solution by a vapor pressure osmometer, of 307. The elemental analysis values of the polymer were as follows:

C: 76.43%, N: 9.49%, H: 14.08%

The amines of the polymer were quantitatively analyzed by the method shown in Example 1, and the results were as follows:
Primary amine 10.1 mole%
Secondary amine 22.9 mole%
Tertiary amine 67.0 mole%

Figure 5:
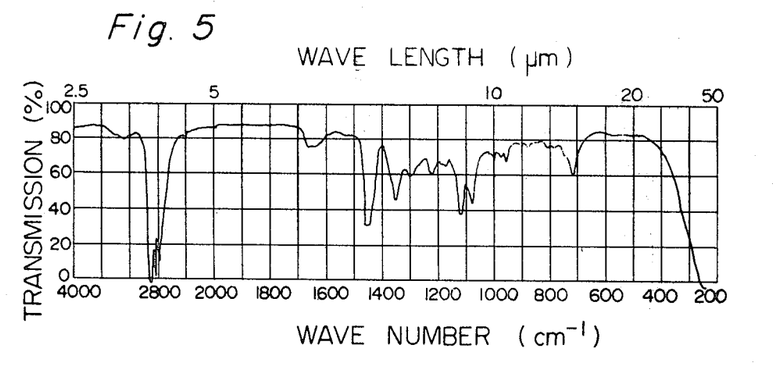
FIG. 5 is an infrared absorption spectrum of the polymer obtained by the method of Comparative Example 1.
Figure 6:
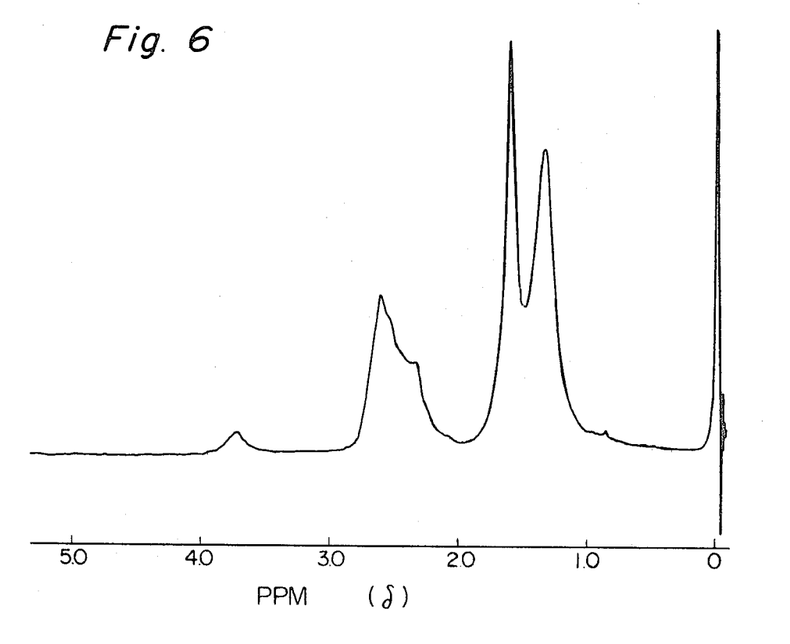
FIG. 6 is a $^1$H-NMR spectrum of the polymer obtained by the method of Comparative Example 1.

The infrared absorption spectrum and $^1$H—NMR spectrum of the polymer are shown in FIGS. 5 and 6, respectively. FIGS. 5 and 6 considerably differed from FIGS. 3 and 4 of Example 12.

From the results of analyses, it was found that the polymer had a much branched structure and was not linear.

One part of the polymer was mixed with 25 parts of each of benzene, styrene, kerosene and heavy oil. The mixture was transferred into a beaker containing 0.1 part of water, and allowed to stand at room temperature for 1 month. No gel was formed in any of the mixtures tested, and the organic solutions remained as a uniform solution.

EXAMPLE 14

A nitrogen-purged 500 ml stainless steel autoclave was charged with 232 g of hexamethylenediamine and 3 g of palladium black, and with stirring, they were heated at 150° C. for 35 hours. As the heating proceeded, ammonia was generated, and the internal pressure of the autoclave increased. Thus, the ammonia was released occasionally to maintain the pressure of reaction system at less than 5 kg/cm$^2$. After the reaction, the reaction mixture was cooled, and the contents of the autoclave were dissolved in methanol. The methanol solution was filtered, and then methanol and low-boiling products were distilled off under reduced pressure to afford 165 g of a white solid polymer having an average molecular weight of 1,520.

One part of the resulting polyhexamethylenimine was mixed with 25 parts of each of benzene, styrene, methyl methacrylate, kerosene, heavy oil and crude oil. The mixture was transferred into a beaker containing water, and allowed to stand at room temperature for 1 hour. All of the mixtures became a pudding-like gel.

A mixture of 1 part of the resulting polyhexamethylenimine and 25 parts of benzene was thoroughly dried, sealed in a nitrogen-purged flask, and allowed to stand there at room temperature for 1 month. No gel was seen to form.

EXAMPLE 15

A dried and nitrogen-purged 500 ml stainless steel autoclave was charged with 58 g of hexamethylenediamine, 30 g of ethylenediamine and 5.3 g of palladium black, and with stirring, they were heated at 160° C. for 40 hours. A yellowish white polymer formed. The polymer was dissolved in methanol, and the methanol solution was filtered. When the solvent and low-boiling products were distilled off by heating under reduced pressure, 64 g of a polymer having an average molecular weight of 845 was obtained. The amount of ammonia generated was 0.98 mole per mole of the starting amine. The results of elemental analysis values of the polymer were as follows:

C: 65.6%, H: 12.7%, N: 21.7%

It was confirmed from the infrared absorption spectrum and the unclear magnetic resonance spectrum of the product that the low-boiling products which had been distilled off under reduced pressure were mainly hexamethylenimine and piperazine.

EXAMPLE 16

A dried and nitrogen-purged 500 ml stainless steel autoclave was charged with 58 g of hexamethylenediamine, 30 g of ethylenediamine, and 5.2 g of palladium black, and with stirring, they were heated at 161° C. for 100 hours. After the reaction, the reaction mixture was worked up in the same way as in Example 15 to afford 62 g of copolyalkylenimine having an average molecular weight of 1,320.

EXAMPLE 17

A dried and nitrogen-purged 500 ml stainless steel autoclave was charged with 57 g of hexamethylenediamine, 29 g of ethylenediamine, and 0.18 g of palladium black, and with stirring, they were heated at 230° C. for 40 hours. After the reaction, the reaction mixture was worked up in the same way as in Example 15 to afford 60 g of copolyalkylenimine having an average molecular weight of 880.

EXAMPLE 18

A dried and nitrogen-purged 500 ml stainless steel autoclave was charged with 58 g of hexamethylenediamine, 29 g of ethylenediamine and 5.4 g of palladium black, and with stirring, the mixture was heated at 200° C. for 8 hours. After the reaction, the reaction mixture was worked up in the same way as in Example 15 to afford 58 g of copolyalkylenimine having an average molecular weight of 740.

EXAMPLE 19

A dried and nitrogen-purged 500 ml stainless steel autoclave was charged with 59 g of hexamethylenediamine, 30 g of ethylenediamine and 27.0 g of palladium black, and with stirring, they were heated at 128° C. for 50 hours. After the reaction, the resulting mixture was worked up in the same way as in Example 15 to afford 55 g of copolyalkylenimine having an average molecular weight of 1,432.

EXAMPLE 20

A dried and nitrogen-purged 500 ml stainless steel autoclave was charged with 57 g of hexamethylenediamine, 28 g of ethylenediamine and 5.3 g of palladium black, and with stirring, they were heated at 218° C. for 50 minutes. After the reaction, the reaction mixture was worked up in the same way as in Example 15 to afford 50 g of copolyalkylenimine having an average molecular weight of 492.

EXAMPLE 21

A dried and nitrogen-purged 500 ml stainless steel autoclave was charged with 58 g of hexamethylenediamine, 30 g of ethylenediamine, 200 ml of benzene and 5.4 g of palladium black, and they were heated at 182° C. for 43 hours. After the reaction, benzene was distilled off to afford 57 g of copolyalkylenimine having an average molecular weight of 780.

EXAMPLE 22

A dried and nitrogen-purged 500 ml stainless steel autoclave was charged with 59 g of hexamethylenediamine, 30 g of ethylenediamine and 11.3 g of palladium acetate, and with stirring, they were heated at 171° C. for 39 hours. After the reaction, the reaction mixture was worked up in the same way as in Example 15 to afford 63 g of copolyalkylenimine having an average molecular weight of 892.

EXAMPLE 23

A dried and nitrogen-purged 500 ml stainless steel autoclave was charged with 87 g of hexamethylenediamine, 15 g of ethylenediamine and 8.7 g of palladium chloride, and with stirring, they were heated at 160° C. for 35 hours. After the reaction, the reaction mixture was worked up in the same way as in Example 15 to afford 79 g of copolyalkylenimine having an average molecular weight of 1,085.

EXAMPLE 24

A dried and nitrogen-purged 500 ml stainless steel autoclave was charged with 39 g of hexamethylenediamine, 40 g of ethylenediamine, and 11.5 g of tetrakis(triphenylphosphine)palladium, and they were heated at 170° C. for 100 hours. After the reaction, the reaction mixture was worked up in the same way as in Example 15 to afford 55 g of copolyalkylenimine having an average molecular weight of 470.

EXAMPLE 25

A dried and nitrogen-purged 500 ml stainless steel autoclave was charged with 58 g of hexamethylenediamine, 30 g of ethylenediamine, and 55 g of a catalyst resulting from supporting 11% palladium black on molecular sieve, and with stirring, they were heated at 170° C. for 40 hours. After the reaction, the reaction mixture was worked up in the same way as in Example 15 to afford 60 g of copolyalkylenimine having an average molecular weight of 890.

EXAMPLE 26

A dried and nitrogen-purged 500 ml stainless steel autoclave was charged with 58 g of hexamethylenediamine, 31 g of ethylenediamine and 54 g of a catalyst resulting from supporting 5% palladium black on α-alumina, and with stirring, they were heated at 160° C. for 80 hours. After the reaction, the reaction mixture was worked up in the same way as in Example 15 to afford 64 g of copolyalkylenimine having an average molecular weight of 939.

EXAMPLES 27 TO 35

The procedure of Example 15 was repeated under the various conditions shown in Table 1. The results are also shown in Table 2.

EXAMPLE 36

A dried and nitrogen-purged 500 ml stainless steel autoclave was charged with 58 g of hexamethylenediamine, 15 g of ethylenediamine, 19 g of 1,3-diaminopropane and 5.4 g of palladium, and they were heated at 175° C. for 120 hours. After the reaction, the reaction mixture was worked up in the same way as in Example 15 to afford 70 g of copolyalkylenimine having an average molecular weight of 1,290.

What we claim is:

1. A method for solidifying liquid organic compounds, which comprises adding polyhexamethylenimine having a number average molecular weight of 500 to 20,000 and having a structural unit of the general formula $-\!\!+\!\!(CH_2)_6NH\!\!+\!\!-$ to a liquid organic compound in the presence of water, said liquid organic compound being selected from the group consisting of aliphatic hydrocarbons, aromatic hydrocarbons, alicyclic hydrocarbons, ester compounds and halogenated hydrocarbons.

2. A method according to claim 1, wherein said polyhexamethylenimine is substantially linear.

3. A method according to claim 1, wherein the amount of the polyhexamethylenimine is 0.1 to 20 parts by weight per 100 parts by weight of the organic compound.

4. A method according to claim 1 or 3, wherein the amount of water is 0.02 to 200 parts by weight per 100 parts by weight of the organic compound.

5. A method according to claim 1 wherein the liquid organic compounds are solidified at a temperature of 0° to 200° C.

6. A method according to claim 5 in which the solidifying temperature is between 10° and 100° C.

TABLE 1

| | Hexamethylene diamine | $H_2N\!\!-\!\!\!+\!\!(CH_2)_m\!\!-\!\!N\!\!\!+\!\!H$ $\qquad\qquad\qquad H$ | Catalyst | Reaction conditions | |
|---|---|---|---|---|---|
| Example | (g) | (g) | (g) | Temperature (°C.) | Time (hr) |
| 27 | 58 | 1,3-Diaminopropane 37 | Palladium black 5.4 | 162 | 72 |
| 28 | 57 | Diethylenetriamine 52 | Palladium black 5.3 | 165 | 83 |
| 29 | 55 | Tetraethylenepentamine 95 | Palladium black 5.4 | 160 | 54 |
| 30 | 59 | 1,4-Diaminobutane 44 | Palladium black 5.4 | 163 | 38 |
| 31 | 58 | 1,9-Diaminononane 79 | Palladium black 5.2 | 163 | 49 |
| 32 | 87 | 1,3-Diaminopropane 19 | Palladium acetate 11.2 | 165 | 51 |
| 33 | 88 | Triethylenetetramine 37 | Tetrakis(triphenylphosphine)palladium 11.5 | 164 | 43 |
| 34 | 88 | 1,9-Diaminononane 40 | Palladium black 5.4 | 164 | 62 |
| 35 | 29 | 1,9-Diaminononane 119 | Palladium black 5.4 | 163 | 63 |

TABLE 2

| Example | Yield of polyalkylenimine (g) | Average molecular weight of polyalkylenimine | Elemental analysis values of copolyalkylenimine (%) | | |
|---|---|---|---|---|---|
| | | | C | H | N |
| 27 | 70 | 1,173 | 67.2 | 12.8 | 19.9 |
| 28 | 87 | 852 | 62.9 | 12.4 | 24.7 |
| 29 | 129 | 998 | 62.0 | 11.1 | 26.9 |
| 30 | 80 | 1,260 | 69.6 | 12.9 | 17.4 |
| 31 | 110 | 1,890 | 73.0 | 13.3 | 13.7 |
| 32 | 80 | 1,051 | 71.2 | 13.0 | 15.8 |
| 33 | 93 | 1,580 | 66.6 | 12.7 | 20.7 |
| 34 | 120 | 2,050 | 74.0 | 13.2 | 12.8 |
| 35 | 122 | 2,190 | 74.9 | 13.4 | 11.7 |